United States Patent Office 3,415,851
Patented Dec. 10, 1968

3,415,851
METHOD FOR THE MANUFACTURE OF STEROIDAL DELTA-1,4-DIENEONES AND NEW PRODUCT OBTAINED THEREBY
Eugene P. Oliveto, Bloomfield, N.J., assignor to Schering Corporation, Bloomfield, N.J., a corporation of New Jersey
No Drawing. Filed Mar. 29, 1956, Ser. No. 574,608
11 Claims. (Cl. 260—397.45)

This invention relates to a novel method for the manufacture of steroidal $\Delta^{1,4}$-diene-3-ones. More particularly, this invention relates to a chemical synthesis whereby steroidal $\Delta^{1,4}$-diene of 3,20-diketo-11-oxygenated pregnanes, their $9\alpha$-halo derivatives and their 2-methyl derivatives and their 2-methyl derivatives are produced.

This invention provides a simple chemical procedure whereby dehydrogenation of the A ring is effected and the $\Delta^{1,4}$-3-keto system is ultimately produced. As will be seen, the state of unsaturation of the A ring is immaterial since the $\Delta^{1,4}$-diene products are obtained from 3-keto-pregnanes, 3-keto-allopregnanes, 3-keto-$\Delta^4$-pregnanes and their substitution products at C-2, such as halogen or methyl, or at C-4 and C-9 such as halogen. Representative of the starting compounds are pregnane-17$\alpha$, 21-diol-3,11,20-trione 21-acetate, its allo isomer, and 21-esters of 2-methylhydrocortisone, $9\alpha$-fluoro-2-methylhydrocortisone, cortisone, hydrocortisone, and the like.

This invention further provides a new group of C-2 alkylated pregnadienes having the following formula:

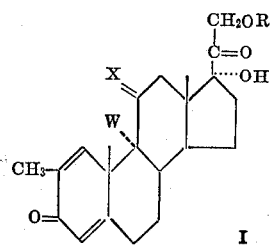

wherein W is a member of the group consisting of H, F, Cl and Br, X is a member of the group consisting of (H, OH) and O, and R is a member of the group consisting of H and acyl.

The compounds of the general formula, as later described, have important therapeutic properties or are easily transformed into physiologically active substances.

It is known that 1-dehydrocortisone, 1-dehydrohydrocortisone and their derivatives are considerably more potent than the parent hormone. (Bunim et al., J. Am. Med. Assoc. 157: 311 (1955); Herzog et al., Science 121: 176 (1955); Hirschmann et al., J.A.C.S. 77: 3166 (1955); Fried et al., J.A.C.S. 77: 418 (1955).) One of the two known chemical routes of such $\Delta^{1,4}$-dieneones involves a multistep synthesis whereby a halogen atom, preferably bromine, is introduced at C-2 and C-4 producing a 2,4-dibromide which is di-dehydrohalogenated to afford the corresponding 3-keto-$\Delta^{1,4}$-diene. This method suffers in that it is a multistep process and most important only low yields of the dienes are obtained. It has also been reported that oxidation of a 3-keto-$\Delta^4$-steroid with lead tetra-acetate gives a 3-keto-$\Delta^{1,4}$-diene, however, the yields in this process are also very low and uneconomical.

I have found that subjecting a 3-keto steroid of the normal or allo series, or a partially unsaturated 3-keto steroid such as a 3-keto-$\Delta^4$ or a 3-keto-$\Delta^1$-steroid with selenium dioxide or its hydrate, selenious acid, in an inert solvent, at moderately elevated temperatures, results in the formation of a 3-keto-$\Delta^{1,4}$-diene system. The dehydrogenating action whereby two double bonds are introduced into a saturated A-ring or one double bond is introduced into a monounsaturated A-ring is surprising in view of the known reactions of 3-keto steroids with selenium dioxide. For example, Stiller and Rosenheim, J. Chem. Soc., 353 (1938) have shown that the reaction of cholestanone with selenium dioxide yields 2,3-diketocholestane. He further qualitatively demonstrated the formation of an $\alpha$-diketone resulting from the reaction of other 3-keto steroids with selenium dioxide. Thus the introduction of an adjacent keto group into a saturated A-ring of a 3-keto steroid has been recognized as being the normal and expected result. I have not only discovered a new and useful reaction of selenium dioxide (as selenious acid) upon a saturated 3-keto steroid but I have also found my reaction to be applicable to 3-keto steroids already possessing an unsaturation in the A-ring at C-1 or C-4. My method of dehydrogenation is simple in that it is a single step process; the moderately elevated temperatures being generally obtained by refluxing the solvent. In the reaction mixture there may be present traces of water, however, I have found the reaction to proceed as well under strictly anhydrous conditions. I prefer to employ aromatic solvents which appear to partially solubilize the selenium dioxide such as benzene, toluene, xylene, chlorobenzene, nitrobenzene and the like, the choice of which is determined by the temperature of operation. However, other inert organic solvents such as acetic acid may be used.

As indicated heretofore, the reaction is applicable to (a) 3-keto steroids having a saturated A ring such as pregnane-17$\alpha$,21-diol-3,11,20-trione, its 21-esters and its allo isomers; (b) to 3-ketone-$\Delta^4$-steroids such as cortisone, hydrocortisone, 2-methylcortisone, 2-methylhydrocortisone, $9\alpha$-fluoro-cortisone, 2-methyl-$9\alpha$-fluoro-hydrocortisone; (c) to 3-keto-$\Delta^1$-steroids represented by 1-pregnene-17$\alpha$,21-diol-3,11,20-trione 21-acetate. In addition to the foregoing which show varying degrees of saturation in the A-ring, I have found that halogenated steroids such as 2-bromo-allopregnane-17$\alpha$,21-diol-3,11,20-trione 21 acetate, 4-chloro-pregnane-17$\alpha$,21-diol-3,11,20-trione 21-acetate, 2-bromo-cortisone acetate, 4-chloro-cortisone acetate, also afford the corresponding 3-keto-1,4-diene compounds from this reaction. With the foregoing halogenated steroids it is evident that treatment with selenium dioxide has no effect upon the halogen atom; the halogen being retained in the final product. I have found that the halogen atom is also retained in the 6-position since reacting 6-bromo-cortisone acetate with selenium dioxide yields 6-bromo-1-dehydrocortisone acetate. The latter halogenated product is easily converted to the physiologically active corticoid 1,4,6-pregnatriene-17$\alpha$,21-diol-3,11,20-dione 21-acetate by known methods for dehydrohalogenating with a mild base.

I have applied my process to the preparation of the new 2-methyl-1,4-pregnadienes of the general Formula I set forth heretofore. The starting materials for the 2-methyl-1,4-pregnadienes are the corresponding 2-methyl-4-pregnenes, J.A.C.S. 77: 6401 (1955). For example, by heating 2-methyl-4-pregnene-11$\beta$,17$\alpha$,21-triol-3,20-dione 21-acetate with selenium dioxide or selenious acid in refluxing toluene, there is obtained 2-methyl-1,4-pregnadiene-11$\beta$,17$\alpha$,21-triol-3,20-dione 21-acetate. In similar fashion, other 2-methyl steroids of the general Formula I may be prepared.

The 2-methyl steroids of general Formula I possess greater biological activity than their mono-unsaturated analogs. They are useful in the treatment of inflammatory diseases such as arthritis and other indications requiring adrenocortical therapy. The compounds of the general Formula I which possess a halogen atom in the 9-position, especially 2-methyl-$9\alpha$-fluoro-1,4-pregnadiene-11$\beta$,17$\alpha$,21-triol-3,20-dione, are useful in treating patients with Addison's disease, or suffering from adrenal insufficiency.

These compounds appear to have a prolonged effect in comparison with hydrocortisone. The compounds of my invention, although retaining their glucogenic properties, appear to have less effect upon retention of sodium and loss of potassium than do the corresponding 2-methyl-4-pregnenes.

The new compounds of my invention may be administered orally in the form of tablets, elixirs and the like or parenterally in the form of solutions or suspensions. For local or topical application, the compounds may be combined with creams and ointments, the concentrations depending upon the indications. In order to prolong the action of my new compounds even further, esterification at the 21-position is particularly advantageous. These new esters are especially useful when applied parenterally or topically. In addition to the lower alkyl esters mentioned heretofore, I also envision as useful compounds esters of cycloaliphatic alkanoic acid such as cyclopentylpropionate esters and esters of isovaleric, T-butylacetic, and enanthic acid. Particularly useful in prolonging duration of activity are furoic esters exemplified by residues of furoic acid and its lower alkyl and halogen substitution products such as 5-t-butylfuroic acid, 5-bromofuroic acid. In the same order of activity as the furoates, are the phenoxyacetate obtained from phenoxyacetic acid, 2,4,5-trichlorophenoxyacetic acid, 4-t-butylphenoxyacetic acid and the like.

The following examples are given for illustrative purposes only, however, it is understood that my invention is limited only by the appended claims.

Example 1.—Conversion of cortisone acetate to 1-dehydrocortisone acetate

A mixture of 2 g. of cortisone acetate, 2 g. of selenium dioxide and 100 ml. of toluene, is heated and refluxed for 2 hours. The mixture is filtered and the solids are washed with water, which is added to the filtrate. The organic solvent is removed by codistillation with water and the precipitated material is extracted with methylene chloride. The methylene chloride solution is washed with dilute sodium bicarbonate solution, dried, and evaporated to a residue. The residue is taken up in a minimum quantity of methylene chloride and chromatographed on a Florisil column (20 grams of adsorbent per gram of steroid) and eluted with methylene chloride containing ½ methanol. The crystals obtained, upon evaporation of the eluates, are recrystallized from acetone-hexane, yielding 1-dehydrocoritisone acetate, M.P. 235–239° λ max. 12,800 at 238 m$\mu$.

Example 2.—Conversion of hydrocortisone acetate to 1-dehydrohydrocortisone acetate A mixture of 1 g. of hydrocortisone acetate, 1 g. of selenious acid and 50 ml. of benzene is refluxed for 48 hours. The mixture is processed, as described in Example 1, affording the diene of this example, M.P. 235–240° C. (after recrystallization from acetone-hexane), λ max. 13,100 at 238 m$\mu$.

Example 3.—2-bromo-1,4-pregnadiene-17α,21-diol-3,11,20-trione 21-acetate

A mixture of 1 g. of 2-bromo-allopregnane-17α,21-diol-3,11,20-trione 21-acetate, 1 g. of selenium dioxide and 50 ml. of chlorobenzene is refluxed for 4 hours. The mixture is cooled to room temperature and the solids removed by filtration. The solvent is removed by steam distillation and the resultant aqueous mixture is extracted with methylene chloride. The organic extract is washed with 5% sodium hydroxide solution, 5% hydrochloric acid and water, in turn, dried and evaporated to a residue. The residue is chromatographed as described in Example 1, yielding 2-bromo-1,4-pregnadiene-17α,21-diol-3,11,20-trione 21-acetate, M.P. 171° C. (dec.) λ max. 9,000 at 247 m$\mu$ (after recrystallization from methanol) $(\alpha)_D$+145° (dioxane).

Example 4.—4-bromo-1,4-pregnadiene-17α,21-diol-3,11,20-trione 21-acetate

The diene of this example is prepared from 4-bromo-pregnan-17α,21-diol-3,11,20-trione 21-acetate according to the procedure described in Example 3 using xylene as solvent, M.P. 235° C. (dec.) λ max. 10,000 at 243 m$\mu$ (after recrystallization from methanol), $(\alpha)_D$+214° (dioxane).

By replacing the 4-bromopregnene starting material in this example with the 4-chloro analog, there is obtained 4 - chloro - 1,4-pregnadiene-17α,21-diol-3,11,20-trione 21-acetate, M.P. 254° (dec.) λ max. 10,600 at 242 m$\mu$, $(\alpha)_D$+214° (dioxane).

Example 5.—Conversion of 6-bromocortisone acetate to 6-bromo-1-dehydrocortisone acetate From the reaction of 1 g. of 6-bromocortisone acetate, 1 g. of selenious acid and 50 ml. of dioxide according to the procedure described in Example 3, there is obtained 6-bromo-1-dehydrocortisone acetate, M.P. 176° (dec.) λ max. 13,600 at 245 m$\mu$ (after recrystallization from methanol).

According to the procedure heretofore described allopregnane-17α,21-diol-3,11,20-trione 21-acetate and pregnane-17α,21-diol-2,11,20-trione 21-acetate is converted to 1-dehydrocortisone acetate described in Example 1.

Example 6.—2-methyl-1,4-pregnadiene-17α,21-diol-3,11,20-trione 21-acetate

From the reaction of 1 g. of 2-methyl-4-pregnene-17α,21-diol-3,11,20-trione 21-acetate, 1 g. of selenium dioxide and 50 ml. of xylene according to the procedures of Example 1, there is obtained the pregnadiene of this example, which is purified by recrystallization from methanol.

The corresponding free 21-OH compound is prepared by saponification in the usual manner. Alternatively, one obtains 2-methyl-1,4-pregnadiene-17α,21-diol-3,11,20-trione from the analogous 3-keto-Δ$^4$-analog by treating same with selenium dioxide. The diol-trione is convertible to 21-esters such as propionate, t-butyl acetate, furoate, t-butyl-furoate and phenoxyacetate by reacting the steroid in known manner with the acid chlorides corresponding to the respective esters.

Example 7.—2-methyl-1,4-pregnadiene-11β,17α,21-triol-3,20-dione 21-acetate

By substituting 2-methyl-4-pregnene-11β,17α,21-triol-3,20-dione 21-acetate in the reaction described in the preceding example, there is obtained a pregnadiene of this example.

In similar fashion, the ester of this example is saponified to yield 2-methyl-1,4-pregnadiene-11β,17α,21-triol-3,20-dione.

Substituting 2-methyl-4-pregnen-11α,17α,21,triol-3,20-dione in the procedure described in the preceding example affords the corresponding 11α-hydroxy epimer.

Example 8.—2-methyl-9α,fluoro-1,4-pregnadiene-11β,17α,21-triol-3,20-dione 21-acetate From the reaction of 2-methyl-9α, fluoro-4-pregnen-11β-17α,21-triol-3,20-dione and selenious acid in chlorobenzene, there is obtained the diene of this example which is purified by recrystallization from methanol.

As described heretofore, the 21-acetate upon saponification yields the corresponding 21-OH compound.

In analogous fashion by starting with the corresponding 9α-bromo or 9α-chloro derivatives, 2-methyl-9α, bromo- or 2-methyl-9α, chloro-1,4-pregnadiene-11β,17α,21-triol-3,20-dione, respectively, is obtained.

I claim:
1. The process for the manufacture of 3-keto-1,4-pregnadienes which comprises heating a steroid of the group consisting of 3-ketopregnanes, 3-ketoallopregnanes, 3-keto-1-pregnenes and 3-keto-4-pregnenes in an inert solvent with a member of the group consisting of selenium dioxide and selenious acid to effect dehydrogenation of the A-ring.

2. Process according to claim 1, wherein the heating takes place in an organic solvent for a number of hours.

3. Process according to claim 1, wherein the heating takes place in an inert organic solvent under reflux for a number of hours.

4. Process according to claim 3, wherein the solvent is monocyclic aromatic.

5. The process for preparing compounds of the formula

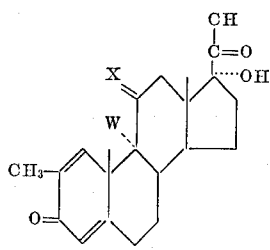

wherein W is a member of the group consisting of H and halogen radicals having an atomic number less than 53, X is a member of the group consisting of (H, OH) and O, and R is a member of the group consisting of H and acyl radicals of alkanoic acids, which comprises heating a pregnene of the formula

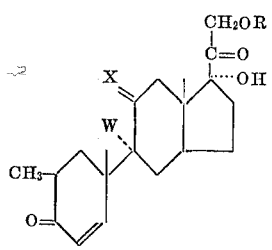

with a member of the group consisting of selenium dioxide and selenious acid in an inert organic solvent.

6. The process for the manufacture of 3-keto-1,4-pregnadienes which comprises heating a 3-keto-pregnane in an inert organic solvent with a member of the group consisting of selenium dioxide and selenious acid and isolating the 3-keto-1,4-pregnadiene so formed.

7. The process according to claim 6 wherein a 3-ketoallopregnane is employed.

8. The process according to claim 6 wherein a 3-keto-4-pregnene is employed.

9. The process according to claim 6 wherein a 3-keto-1-pregnene is employed.

10. The process which comprises heating a 3,20-diketo-17α,21-dihydroxy-4-pregnene 21-ester with a member of the group consisting of selenium dioxide and selenious acid in an inert organic solvent and isolating the 3,20-diketo-17α,21-dihydroxy-1,4-pregnadiene 21-ester so formed.

11. A process which comprises heating at an elevated temperature a 1(2)-saturated steroid of the $\Delta^4$-3-keto-pregnene series with at least one equivalent of selenium dioxide in an organic solvent to produce the corresponding $\Delta^{1,4}$-3-keto-pregnadiene.

References Cited

UNITED STATES PATENTS

| 2,735,855 | 2/1956 | Djerassi | 260—397.45 |
| 2,736,734 | 2/1956 | Sarett | 260—397.45 |
| 2,767,155 | 10/1956 | Oliveto | 260—397.45 |
| 2,767,199 | 10/1956 | Djerassi | 260—397.45 |
| 2,837,464 | 6/1958 | Nobile | 195—51 |
| 2,957,893 | 10/1960 | Herzogetal | 260—397.45 |

ELBERT L. ROBERTS, *Primary Examiner.*

U.S. Cl. X.R.

167—65; 260—397.47

UNITED STATES PATENT OFFICE
CERTIFICATE OF CORRECTION

Patent No. 3,415,851                      December 10, 1968

Eugene P. Oliveto

It is certified that error appears in the above identified patent and that said Letters Patent are hereby corrected as shown below:

Column 3, line 45, "1/2 methanol" should read -- 1/2% methan --. Column 4, line 25, "pregnane-17α,21-diol-2,11,20-trione" should read -- pregnane-17α,21-diol-3,11,20-trione --. Column 5, lines 12 to 22, the formula should appear as shown below:

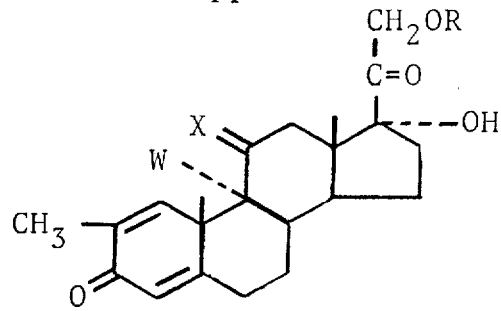

same column 5, lines 31 to 40, the formula should appear as shown below:

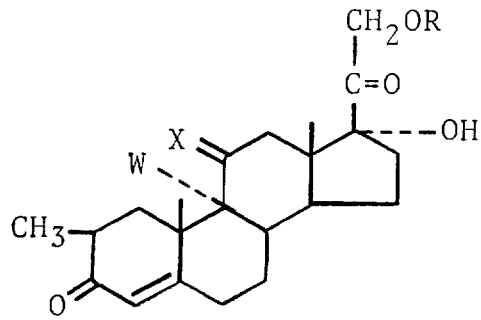

Signed and sealed this 24th day of March 1970.

(SEAL)
Attest:

EDWARD M. FLETCHER, JR.
Attesting Officer

WILLIAM E. SCHUYLER, JR.
Commissioner of Patents